United States Patent
Petrofsky et al.

(10) Patent No.: US 10,078,772 B2
(45) Date of Patent: Sep. 18, 2018

(54) SCANNING SYSTEM FOR SCANNING OBJECTS IN RADIOACTIVE ENVIRONMENT

(71) Applicant: Mallinckrodt Nuclear Medicine LLC, Hazelwood, MO (US)

(72) Inventors: Bryan S. Petrofsky, St. Louis, MO (US); Kevin B. Graves, Catawissa, MO (US); Sumit Verma, Chesterfield, MO (US); Michael J. D'Hooge, Bridgeton, MO (US); John Schmitz, St. Charles, MO (US)

(73) Assignee: Mallinckrodkt Nuclear Medicine LLC, Maryland Heights, MO (US)

( * ) Notice: Subject to any disclaimer, the term of this patent is extended or adjusted under 35 U.S.C. 154(b) by 0 days.

(21) Appl. No.: 15/408,006

(22) Filed: Jan. 17, 2017

(65) Prior Publication Data
US 2018/0018490 A1    Jan. 18, 2018

Related U.S. Application Data

(60) Provisional application No. 62/362,814, filed on Jul. 15, 2016.

(51) Int. Cl.
*G06K 7/10* (2006.01)
*G06K 7/14* (2006.01)
(Continued)

(52) U.S. Cl.
CPC ....... *G06K 7/1417* (2013.01); *G06K 7/10405* (2013.01); *G06K 7/10722* (2013.01);
(Continued)

(58) Field of Classification Search
CPC ........... G06K 7/10851; G06K 7/10732; G06K 7/10722; G06K 7/10693; G06K 7/10801;
(Continued)

(56) References Cited

U.S. PATENT DOCUMENTS

| | | | | |
|---|---|---|---|---|
| 4,254,408 A | * | 3/1981 | Kerschner, III | ....... B60K 37/02 340/815.75 |
| 4,742,220 A | | 5/1988 | Beyor | |

(Continued)

FOREIGN PATENT DOCUMENTS

| | | |
|---|---|---|
| WO | 2009152320 A2 | 12/2009 |
| WO | 2011126522 A2 | 10/2011 |

OTHER PUBLICATIONS

International Search Report and Written Opinion of the International Searching Authority regarding PCT/US2017/013880 dated May 15, 2017; pp. 14.

*Primary Examiner* — Jamara Franklin
(74) *Attorney, Agent, or Firm* — Armstrong Teasdale LLP

(57) ABSTRACT

A system for manufacturing radionuclide generators includes an enclosure defining a radioactive environment. The enclosure includes radiation shielding to prevent radiation within the radioactive environment from moving to an exterior of the enclosure. The system also includes a barcode positioned on an object within the enclosure and a scanning system for scanning the barcode. The scanning system includes a camera on the exterior of the enclosure, a mirror, and a conduit extending through a wall of the enclosure for light to travel between the camera and the mirror.

20 Claims, 14 Drawing Sheets

(51) Int. Cl.
    *G06K 19/06* (2006.01)
    *G06K 19/07* (2006.01)
    *G21F 7/00* (2006.01)
    *G21G 1/00* (2006.01)

(52) U.S. Cl.
    CPC ..... *G06K 7/10821* (2013.01); *G06K 7/10861* (2013.01); *G06K 7/1447* (2013.01); *G06K 19/06037* (2013.01); *G06K 19/0717* (2013.01); *G21F 7/00* (2013.01); *G21G 1/0005* (2013.01)

(58) Field of Classification Search
    CPC .. G06K 7/10792; G06C 20/203; G06Q 10/08; G06Q 10/087; G07F 17/3293
    USPC .... 235/383, 462.01, 462.14, 462.22, 462.32, 235/462.41, 462.42, 462.43
    See application file for complete search history.

(56) References Cited

U.S. PATENT DOCUMENTS

| | | | |
|---|---|---|---|
| 5,296,689 A | 3/1994 | Reddersen et al. | |
| 5,315,095 A | 5/1994 | Marom et al. | |
| 5,550,367 A | 8/1996 | Plesko | |
| 5,744,790 A | 4/1998 | Li | |
| 5,818,018 A | 10/1998 | Conboy et al. | |
| 5,828,052 A | 10/1998 | Reynolds et al. | |
| 5,914,477 A | 6/1999 | Wang | |
| 6,045,046 A | 4/2000 | Detwiler | |
| 6,237,851 B1 | 5/2001 | Detwiler | |
| 6,390,369 B1 | 5/2002 | Tang et al. | |
| 6,543,694 B1 | 4/2003 | Detwiler | |
| 6,543,695 B1 | 4/2003 | Hamilton et al. | |
| 6,595,422 B1 * | 7/2003 | Doljack | G06K 7/10722 235/462.42 |
| 6,685,678 B2 | 2/2004 | Evans et al. | |
| 6,771,398 B2 | 8/2004 | Roth | |
| 6,988,664 B1 | 1/2006 | Lee et al. | |
| 7,074,209 B2 | 7/2006 | Evans et al. | |
| 7,115,113 B2 | 10/2006 | Evans et al. | |
| 7,188,773 B2 | 3/2007 | Lee et al. | |
| 7,325,743 B2 | 2/2008 | Hamilton et al. | |
| 8,118,228 B2 | 2/2012 | Good | |
| 8,205,478 B2 | 6/2012 | Hallisey | |
| 8,430,318 B2 | 4/2013 | McQueen et al. | |
| 8,552,313 B2 | 10/2013 | Atwater et al. | |
| 8,856,033 B2 | 10/2014 | Hicks et al. | |
| 9,141,839 B2 | 9/2015 | Xian et al. | |
| 2001/0030771 A1 | 10/2001 | Roth | |
| 2001/0056258 A1 | 12/2001 | Evans | |
| 2003/0141370 A1 | 7/2003 | Hamilton et al. | |
| 2004/0082918 A1 | 4/2004 | Evans et al. | |
| 2006/0065736 A1 | 3/2006 | Lee et al. | |
| 2006/0144942 A1 | 7/2006 | Evans et al. | |
| 2006/0192014 A1 | 8/2006 | Hamilton et al. | |
| 2006/0255151 A1 | 11/2006 | Tien | |
| 2010/0139989 A1 | 6/2010 | Atwater et al. | |
| 2010/0211449 A1 | 8/2010 | Nelson | |
| 2010/0258632 A1 | 10/2010 | Good | |
| 2011/0168780 A1 | 7/2011 | McQueen et al. | |
| 2012/0228381 A1 | 9/2012 | Drzymala et al. | |
| 2014/0034398 A1 | 2/2014 | Atwater et al. | |
| 2014/0249942 A1 | 9/2014 | Hicks et al. | |
| 2014/0361082 A1 | 12/2014 | Xian et al. | |
| 2015/0356391 A1 | 12/2015 | Nowaczyk | |
| 2015/0376988 A1 | 12/2015 | Schumacher et al. | |
| 2016/0033761 A1 | 2/2016 | Murayama et al. | |
| 2016/0055357 A1 | 2/2016 | Hicks et al. | |

* cited by examiner

US 10,078,772 B2

SCANNING SYSTEM FOR SCANNING OBJECTS IN RADIOACTIVE ENVIRONMENT

CROSS-REFERENCE TO RELATED APPLICATIONS

This application claims priority to U.S. Provisional Patent Application Ser. No. 62/362,814, filed Jul. 15, 2016, the disclosure of which is hereby incorporated by reference in its entirety.

FIELD

The field of the disclosure relates generally to a scanning system and, more particularly, to a scanning system for scanning objects in a radioactive environment.

BACKGROUND

Radioactive material is used in nuclear medicine for diagnostic and therapeutic purposes by injecting a patient with a small dose of the radioactive material, which concentrates in certain organs or regions of the patient. Radioactive materials typically used for nuclear medicine include Germanium-68 ("Ge-68"), Strontium-87m, Technetium-99m ("Tc-99m"), Indium-111m ("In-111"), Iodine-131 ("I-131") and Thallium-201. Such radioactive materials may be produced using a radionuclide generator. Radionuclide generators generally include a column that has media for retaining a long-lived parent radionuclide that spontaneously decays into a daughter radionuclide that has a relatively short half-life. The column may be incorporated into a column assembly that has a needle-like outlet port that receives an evacuated vial to draw saline or other eluant liquid, provided to a needle-like inlet port, through a flow path of the column assembly, including the column itself. This liquid may elute and deliver daughter radionuclide from the column and to the evacuated vial for subsequent use in nuclear medical imaging applications, among other uses.

During manufacture of the radionuclide generators, the radionuclide generators may be labeled to allow tracking of the radionuclide generators. However, it may be difficult to scan the labels while the radionuclide generators are in a shielded enclosure defining a radioactive environment.

Accordingly, a need exists for a scanning system that scans objects in a radioactive environment and is not affected by radiation from the radioactive environment.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a system for manufacturing radionuclide generators is provided. The system includes an enclosure defining a radioactive environment. The enclosure includes radiation shielding to prevent radiation within the radioactive environment from moving to an exterior of the enclosure. The system also includes a barcode positioned on an object within the enclosure and a scanning system for scanning the barcode. The scanning system includes a camera on the exterior of the enclosure, a mirror, and a conduit extending through a wall of the enclosure for light to travel between the camera and the mirror.

In another aspect, a scanning system for scanning objects in a radioactive environment is provided. The objects are in an interior space of a hot cell. The scanning system includes a camera on the exterior of the hot cell, a mirror, and a conduit extending through a wall of the hot cell for light to travel between the camera and the mirror.

In yet another aspect, a method for scanning a barcode on an object in a radioactive environment is provided. The object is in an interior space of a hot cell. The method includes positioning the object in the interior space such that light travels from the barcode to a mirror. The method also includes directing the light from the mirror through a conduit extending through a wall of the hot cell toward a camera on an exterior of the hot cell. The method further includes generating an image of the barcode using the camera.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the several views of the drawings.

DETAILED DESCRIPTION

Figure 1:
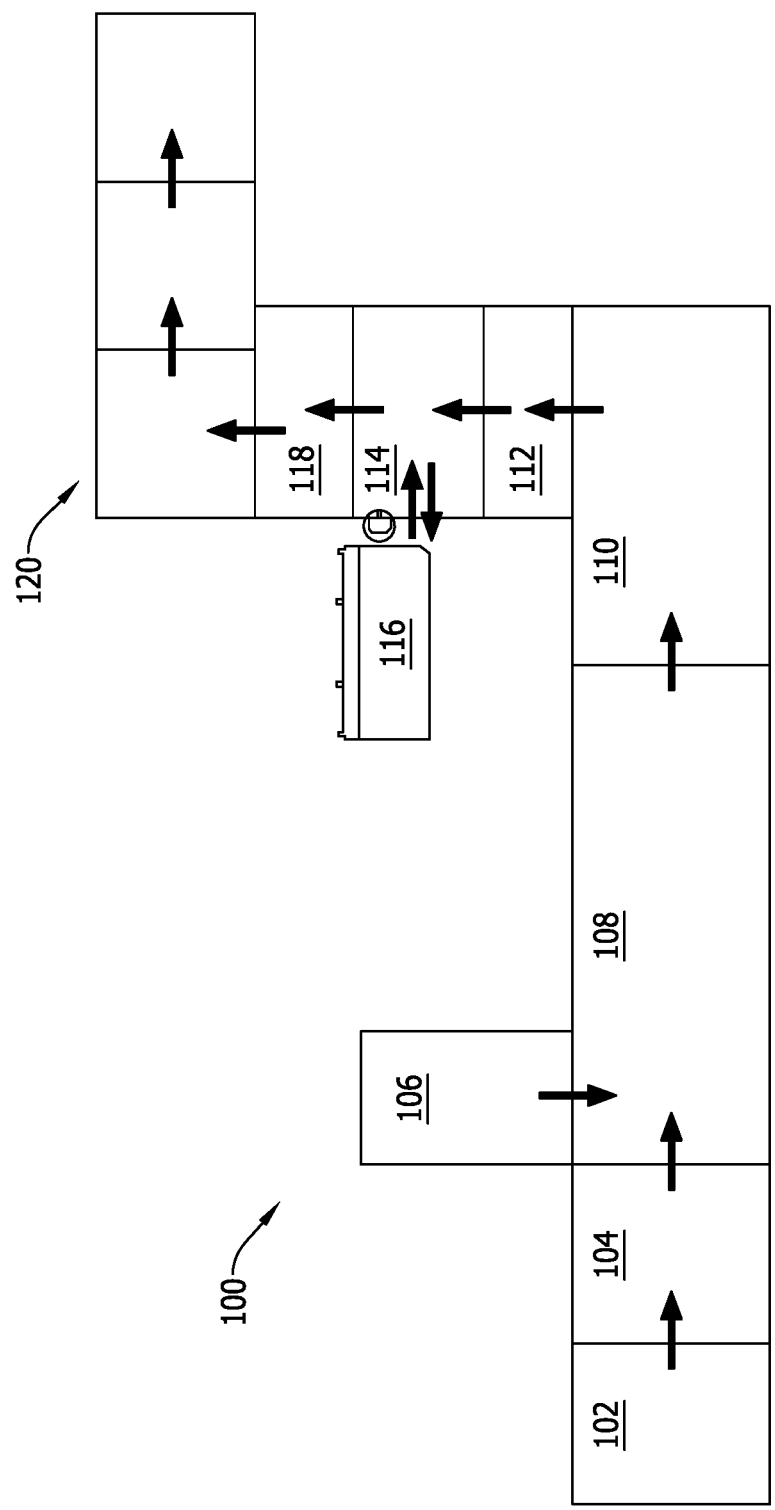
FIG. 1 is a schematic view of a system for producing radionuclide generators.

FIG. 1 is a schematic view of a system 100 for manufacturing radionuclide generators. The system 100 shown in FIG. 1 may be used to produce various radionuclide generators, including, for example and without limitation, Technetium generators, Indium generators, and Strontium generators. The system 100 of FIG. 1 is particularly suited for producing Technetium generators. A Technetium generator is a pharmaceutical drug and device used to create sterile injectable solutions containing Tc-99m, an agent used in diagnostic imaging with a relatively short 6-hour radiological half-life, allowing the Tc-99m to be relatively quickly eliminated from human tissue. Tc-99m is "generated" via the natural decay of Molybdenum ("Mo-99"), which has a 66-hour half-life, which is desirable because it gives the generator a relatively long two-week shelf life. During generator operation (i.e., elution with a saline solution), Mo-99 remains chemically bound to a core alumina bed (i.e., a retaining media) packed within the generator column, while Tc-99m washes free into an elution vial, ready for injection into a patient. While the system 100 is described herein with reference to Technetium generators, it is understood that the system 100 may be used to produce radionuclide generators other than Technetium generators.

As shown in FIG. 1, the system 100 generally includes a plurality of stations. In the example embodiment, the system 100 includes a cask loading station 102, a formulation station 104, an activation station 106, a fill/wash station 108, an assay/autoclave loading station 110, an autoclave station 112, an autoclave unloading station 114, a quality control testing station 116, a shielding station 118, and a packaging station 120.

The cask loading station 102 is configured to receive and handle casks or containers of radioactive material, such as a parent radionuclide, and transfer the radioactive material to the formulation station 104. Radioactive material may be transported in secondary containment vessels and flasks that need to be removed from an outer cask prior to formulation. The cask loading station 102 includes suitable tooling and mechanisms to extract secondary containment vessels and flasks from outer casks, as well as transfer of flasks to the formulation cell. Suitable devices that may be used in the cask loading station include, for example and without limitation, telemanipulators.

At the formulation station 104, the raw radioactive material (i.e., Mo-99) is quality control tested, chemically treated if necessary, and then pH adjusted while diluting the raw radioactive material to a desired final target concentration. The formulated radioactive material is stored in a suitable containment vessel (e.g., within the formulation station 104).

Column assemblies containing a column of retaining media (e.g., alumina) are activated at the activation station 106 to facilitate binding of the formulated radioactive material with the retaining media. In some embodiments, column assemblies are activated by eluting the column assemblies with a suitable volume of hydrogen chloride (HCl) at a suitable pH level. Column assemblies are held for a minimum wait time prior to charging the column assemblies with the parent radionuclide.

Following activation, column assemblies are loaded into the fill/wash station 108 using a suitable transfer mechanism (e.g., transfer drawer). Each column assembly is then charged with parent radionuclide by eluting formulated radioactive solution (e.g., Mo-99) from the formulation station 104 through individual column assemblies using suitable liquid handling systems (e.g., pumps, valves, etc.). The volume of formulated radioactive solution eluted through each column assembly is based on the desired curie (Ci) activity for the corresponding column assembly. The volume eluted through each column assembly is equivalent to the total Ci activity identified at the time of calibration for the column assembly. For example, if a volume of formulated Mo-99 required to make a 1.0 Ci generator (at time of calibration) is 'X', the volume required to make a 19.0 Ci generator is simply 19 times X. After a minimum wait time, the charged column assemblies are eluted with a suitable volume and concentration of acetic acid, followed by an elution with a suitable volume and concentration of saline to "wash" the column assemblies. Column assemblies are held for a minimum wait time before performing assays on the column assemblies.

The charged and washed column assemblies (or radionuclide generators) are then transferred to the assay/autoclave load station 110, in which assays are taken from each column assembly to check the amount of parent and daughter radionuclide produced during elution. Each column assembly is eluted with a suitable volume of saline, and the resulting solution is assayed to check the parent and daughter radionuclide levels in the assay. Where the radioactive material is Mo-99, the elutions are assayed for both Tc-99m and Mo-99. Column assemblies having a daughter radionuclide (e.g., Tc-99m) assay falling outside an acceptable range calculation are rejected. Column assemblies having a parent radionuclide (e.g., Mo-99) breakthrough exceeding a maximum acceptable limit are also rejected.

Following the assay process, tip caps are applied to the outlet port and the fill port of the column assembly. Column assemblies may be provided with tip caps already applied to the inlet port. If the column assembly is not provided with a tip cap pre-applied to the inlet port, a tip cap may be applied prior to, subsequent to, or concurrently with tip caps being applied to the outlet port and the fill port. Assayed, tip-capped column assemblies are then loaded into an autoclave sterilizer located in the autoclave station 112 for terminal sterilization. The sealed column assemblies are subjected to an autoclave sterilization process within the autoclave station 112 to produce terminally-sterilized column assemblies.

Following the autoclave sterilization cycle, column assemblies are unloaded from the autoclave station 112 into the autoclave unloading station 114. Column assemblies are then transferred to the shielding station 118 for shielding.

Some of the column assemblies are transferred to the quality control testing station 116 for quality control. In the example embodiment, the quality control testing station 116 includes a QC testing isolator that is sanitized prior to QC testing, and maintained at a positive pressure and a Grade A clean room environment to minimize possible sources of contamination. Column assemblies are aseptically eluted for in-process QC sampling, and subjected to sterility testing within the isolator of the quality control testing station 116. Tip caps are applied to the inlet and outlet needles of the column assemblies before the column assemblies are transferred back to the autoclave unloading station 114.

The system 100 includes a suitable transfer mechanism for transferring column assemblies from the autoclave unloading station 114 (which is maintained at a negative pressure differential, Grade B clean room environment) to the isolator of the quality control testing station 116. In some embodiments, column assemblies subjected to quality control testing may be transferred from the quality control testing station 116 back to the autoclave unloading station 114, and can be re-sterilized and re-tested, or re-sterilized and packaged for shipment. In other embodiments, column assemblies are discarded after being subjected to QC testing.

In the shielding station 118, column assemblies from the autoclave unloading station 114 are visually inspected for container closure part presence, and then placed within a radiation shielding container (e.g., a lead plug). The radiation shielding container is inserted into an appropriate safe constructed of suitable radiation shielding material (e.g., lead, tungsten or depleted uranium). Shielded column assemblies are then released from the shielding station 118.

In the packaging station 120, shielded column assemblies from the shielding station 118 are placed in buckets pre-labeled with appropriate regulatory (e.g., FDA) labels. A label uniquely identifying each generator is also printed and applied to each bucket. A hood is then applied to each bucket. A handle is then applied to each hood.

The system 100 may generally include any suitable transport systems and devices to facilitate transferring column assemblies between stations. In some embodiments, for example, each of the stations includes at least one telemanipulator to allow an operator outside the hot cell environment (i.e., within the surrounding room or lab) to manipulate and transfer column assemblies within the hot cell environment. Moreover, in some embodiments, the system 100 includes a conveyance system to automatically transport column assemblies between the stations and/or between substations within one or more of the stations (e.g., between a fill substation and a wash substation within the fill/wash station 108).

In the example embodiment, some stations of the system 100 include and/or are enclosed within a shielded nuclear radiation containment chamber, also referred to herein as a "hot cell". Hot cells generally include an enclosure constructed of nuclear radiation shielding material designed to shield the surrounding environment from nuclear radiation. Suitable shielding materials from which hot cells may be constructed include, for example and without limitation, lead, depleted uranium, and tungsten. In some embodiments, hot cells are constructed of steel-clad lead walls forming a cuboid or rectangular prism. In some embodiments, a hot cell may include a viewing window constructed of a transparent shielding material. Suitable materials from which viewing windows may be constructed include, for example and without limitation, lead glass. In the example embodiment, each of the cask loading station 102, the formulation station 104, the fill/wash station 108, the assay/autoclave loading station 110, the autoclave station 112, the autoclave unloading station 114, and the shielding station 118 include and/or are enclosed within a hot cell.

In some embodiments, one or more of the stations are maintained at a certain clean room grade (e.g., Grade B or Grade C). In the example embodiment, pre-autoclave hot cells (i.e., the cask loading station 102, the formulation station 104, the fill/wash station 108, the assay/autoclave loading station 110) are maintained at a Grade C clean room environment, and the autoclave unloading cell or station 114 is maintained at a Grade B clean room environment. The shielding station 118 is maintained at a Grade C clean room environment. The packaging stations 120 are maintained at a Grade D clean room environment.

Additionally, the pressure within one or more stations of the system 100 may be controlled at a negative or positive pressure differential relative to the surrounding environment and/or relative to adjacent cells or stations. In some embodiments, for example, all hot cells are maintained at a negative pressure relative to the surrounding environment. Moreover, in some embodiments, the isolator of the quality control testing station 116 is maintained at a positive pressure relative to the surrounding environment and/or relative to adjacent stations of the system 100 (e.g., relative to the autoclave unloading station 114).

Figure 2:
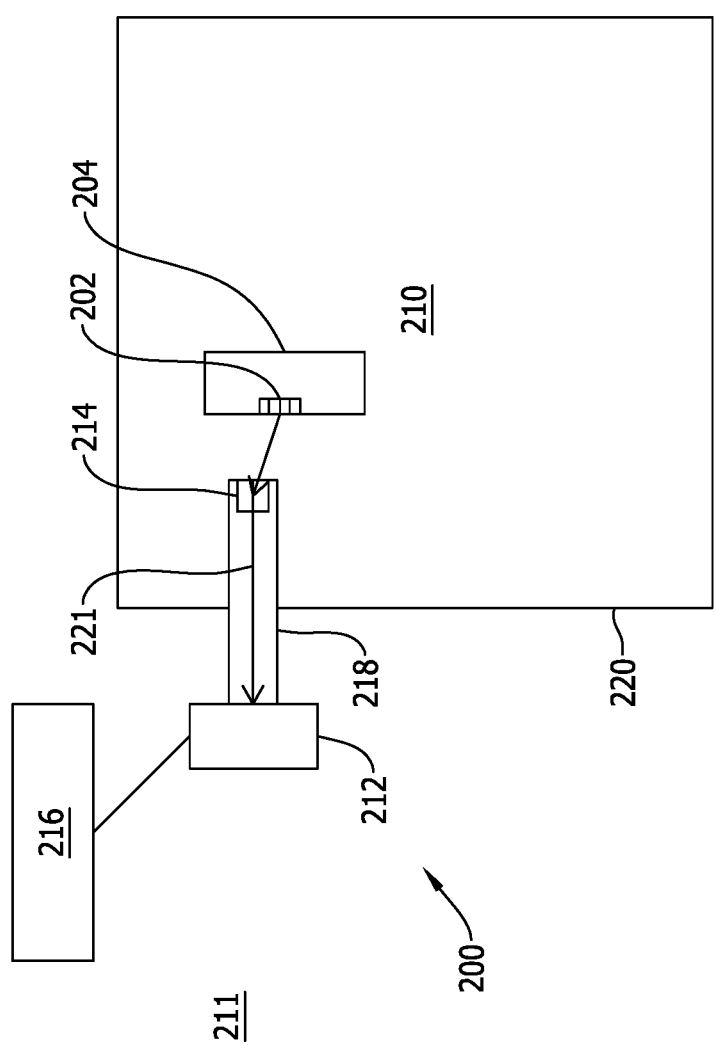
FIG. 2 is a schematic view of a scanning system for use with the system shown in FIG. 1.

As shown in FIG. 2, a scanning system 200 may be used to scan objects during operation of system 100. For example, the scanning system 200 may be used to scan objects in the fill/wash station 108, the assay/autoclave loading station 110, and the autoclave unloading station 114. In other embodiments, the scanning system 200 may scan any objects inside and/or outside any stations of system 100. In this embodiment, the scanning system 200 reads barcodes 202 attached to generators 204 as the generators are moved through the system 100. In some embodiments, the barcodes 202 are attached to racks for the generators 204 and are not necessarily attached directly to the generators 204.

Figure 3:
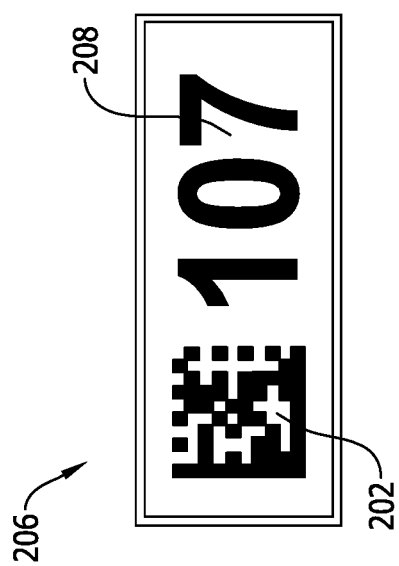
FIG. 3 is an illustration of a label including a barcode.

In reference to FIG. 3, each generator 204 may include a label 206 with a unique barcode 202. As used throughout this description, the term "barcode" refers to a grouping of symbols that represents data such as a multi-digit number. In suitable embodiments, the barcode 202 may represent data that is associated with a specific generator 204 in a batch. In this embodiment, the barcode 202 is a 2-dimensional barcode including a data matrix symbology that represents a 3-digit number. In other embodiments, the barcode 202 may represent text, numbers, and/or any other suitable data. In suitable embodiments, the barcode 202 may be any size and printed in any manner that enables the scanning system to operate as described. In this embodiment, the barcode 202 is approximately 0.5×0.5 inches in size and includes black ink on a white or gray background. In other embodiments, the label 206 may include any barcode 202 that enables the scanning system to operate as described. For example, in some embodiments, the label 206 may include a one-dimensional barcode 202. In this embodiment, the label 206 includes a multi-digit number 208. In further embodiments, the label may include any number, text, and/or image.

With reference to FIGS. 1-2, the barcode 202 may be scanned at any stage during the processing of the generators 204. In this embodiment, the barcode 202 is scanned at three locations in the fill/wash station 108, two locations in the assay/autoclave loading station 110, and two locations within the autoclave unloading station 114. As a result, the barcodes 202 allow each generator 204 in a batch to be tracked as the generators 204 are moved through the system 100. In suitable embodiments, the system 100 may include any number of the scanning systems 200. For example, in suitable embodiments, the system 100 may include at least one scanning system 200 at each station.

In reference to FIG. 2, in suitable embodiments, the scanning system 200 may be located a distance above a work surface and above telemanipulator ports. For example, in some embodiments, the scanner system 200 may be located a distance above the work surface in a range from about 4 feet (1.2 meters) to about 5 feet (1.5 meters). In this embodiment, the scanning system 200 is located adjacent a ceiling of a hot cell 210 such that the scanning system 200 does not interfere with operation of telemanipulators and automation tooling near the work surface. In addition, the location of the scanning system 200 may allow the scanning system to generate a flat image of the barcode 202. Moreover, the location of the scanning system 200 inhibits radiation being transmitted through the scanning system to an exterior 211 of the hot cell 210. In other embodiments, the scanning system 200 may be positioned in any location that enables the scanning system to operate as described.

In operation, the scanning system 200 generates an image of a target area. For example, in suitable embodiments, the scanning system 200 may generate an image of a target area greater than approximately 0.5 inches (2.5 cm) by 0.5 inches (2.5 cm), and less than approximately 3 inches (7.6 cm)×3 inches (7.6 cm). As will be described below, a camera 212 and a mirror 214 of the scanning system 200 may be adjusted to vary the size and location of the target area. Suitably, the scanning system 200 may be adjusted to generate images of target areas anywhere on the work surface. In other embodiments, the scanning system 200 may generate images of any target areas that enable the scanning system to operate as described.

Also, in this embodiment, the scanning system 200 utilizes ambient lighting in the hot cell 210 to generate images. In other words, the scanning system 200 does not require additional lighting, such as spotlights, to generate images of objects in the hot cells 210. In other embodiments, the scanning system 200 may utilize any lighting that enables the scanning system to operate as described.

In this embodiment, the scanning system 200 may translate the barcode's grouping of symbols into a multi-digit number when the camera 212 generates an image of the barcode. Accordingly, the scanning system 200 acts as a camera-based scanner. In other embodiments, the scanning system 200 may include any type of scanner that enables the scanning system to operate as described. For example, in some embodiments, the scanning system 200 may include, without limitation, any of the following: an omnidirectional barcode scanner, a charge coupled device (CCD) scanner, a laser scanner, and any other barcode reader.

The scanning system 200 may send the translated information to a controller 216 and the controller can relate the information to a specific generator 204. The information may include numbers, letters, and/or any other suitable data. Accordingly, the controller 216 may track generators 204 as the generators move through the system 100.

As shown in FIG. 2, the scanning system 200 includes a camera 212, a mirror 214, and a housing 218. The camera 212 and the mirror 214 are positioned at opposite ends of the housing 218. The mirror 214 is located in the end of the housing 218 within the hot cell 210 and the camera 212 is located on the exterior of the hot cell. The housing 218 forms a conduit for light 221 to travel through a shielded wall 220 that separates the interior of the hot cell 210 from the exterior of the hot cell. For example, the housing 218 includes a narrow diameter portion, shown in FIG. 4, that extends through the hot cell walls 220, which are constructed of radiation shielding materials, such as lead, tungsten, or depleted uranium. Additionally in some embodiments, the housing 218 may include radiation-shielding materials to further inhibit radiation from being transmitted through the scanning system 200 to the outside environment. Moreover, the mirror 214 redirects light towards the camera 212. Accordingly, light travels along an indirect path between the interior of the hot cell 210 and the exterior of the hot cell. The indirect path inhibits radiation being transmitted to the exterior of the hot cell from the interior of the hot cell. Moreover, the camera 212 is located on the exterior of the hot cell 210 and is not exposed to high radiation and corrosive chemicals that may be used within the hot cell. As a result, the scanning system 200 has an increased service life.

Figure 4:
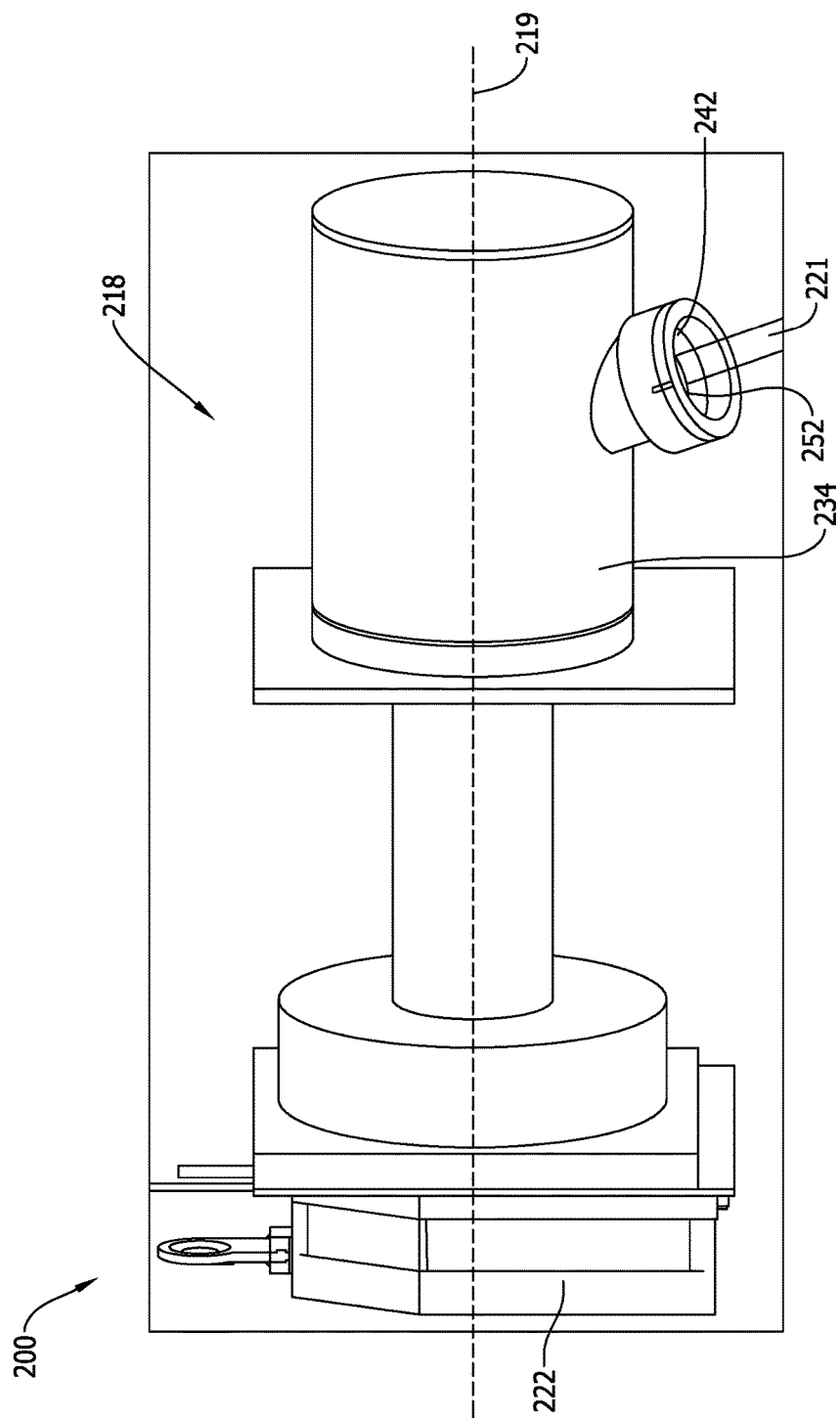
FIG. 4 is an isometric view of the scanning system shown in FIG. 2.
Figure 5:
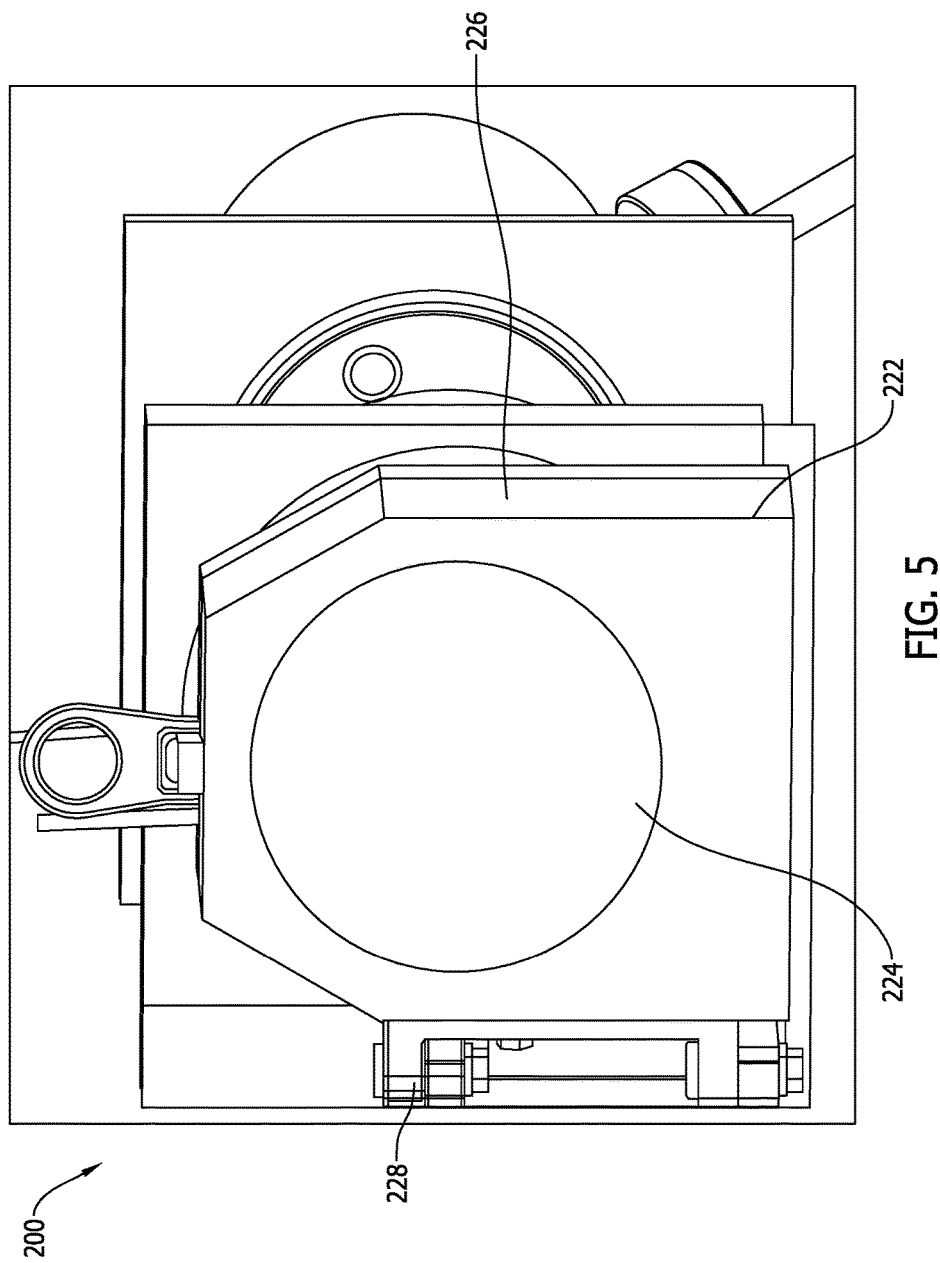
FIG. 5 is an isometric view of an end of the scanning system.
Figure 6:
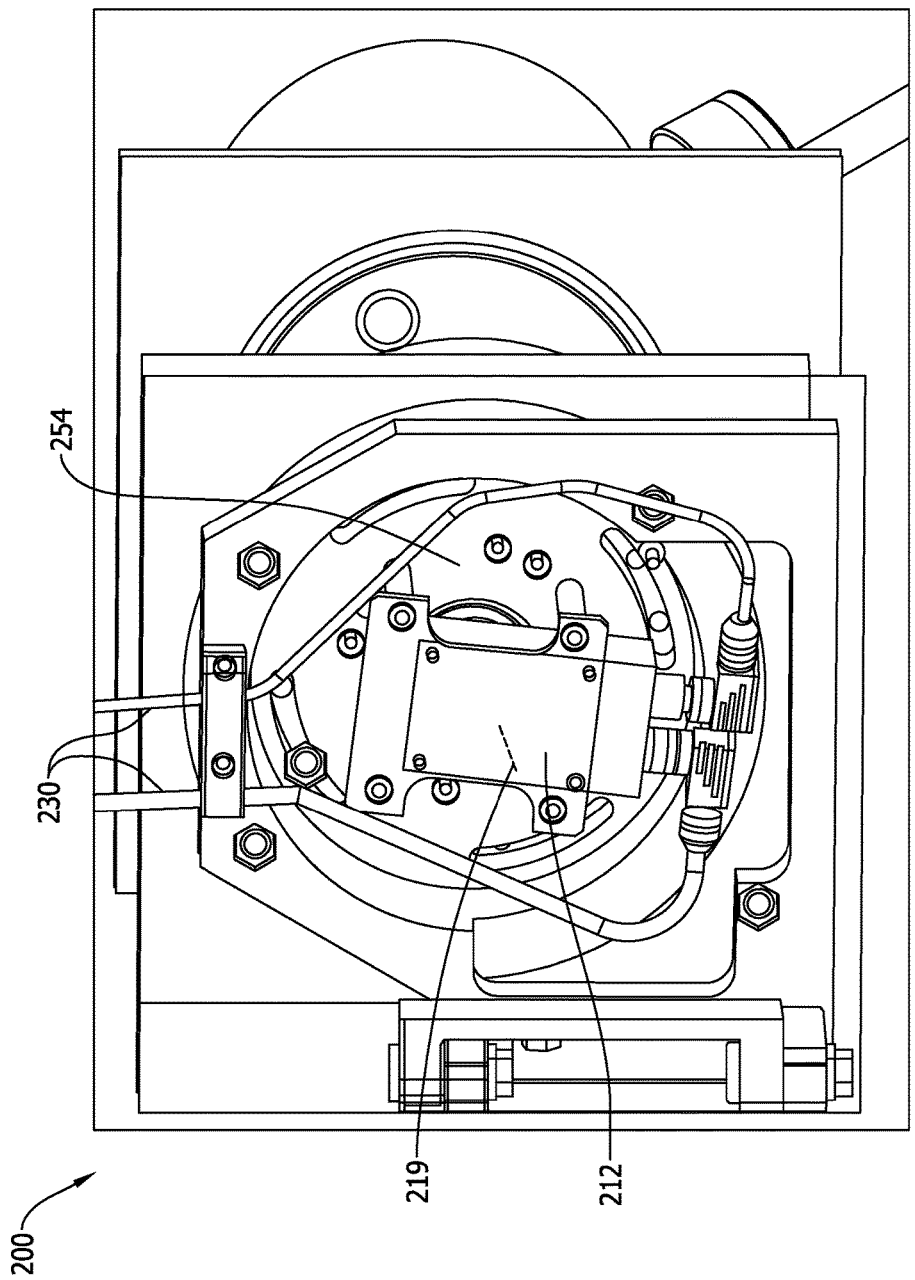
FIG. 6 is an isometric view of the scanning system with a panel removed to show a camera.
Figure 7:
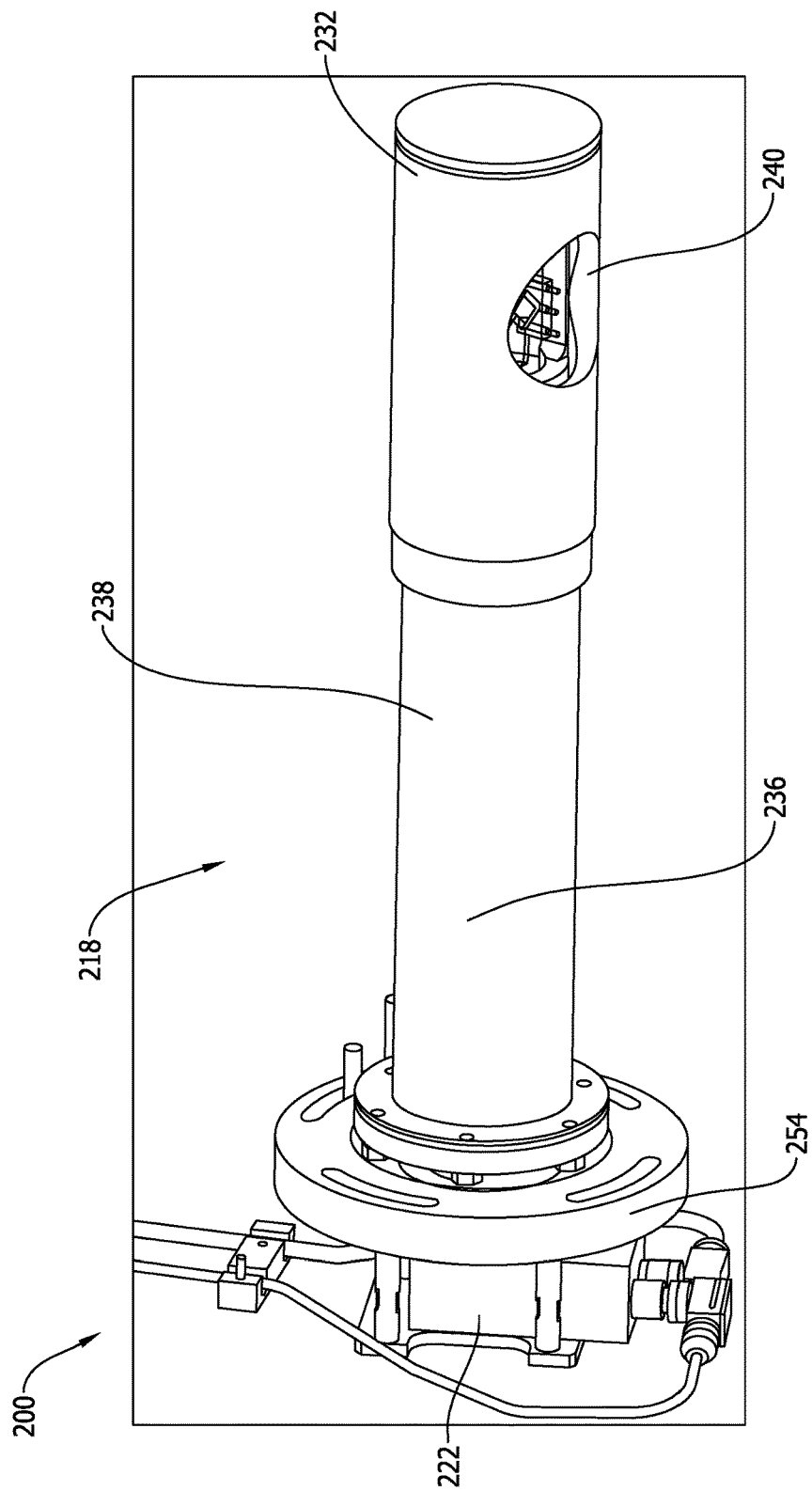
FIGS. 7-10 are isometric views of portions of the scanning system.
Figure 8:
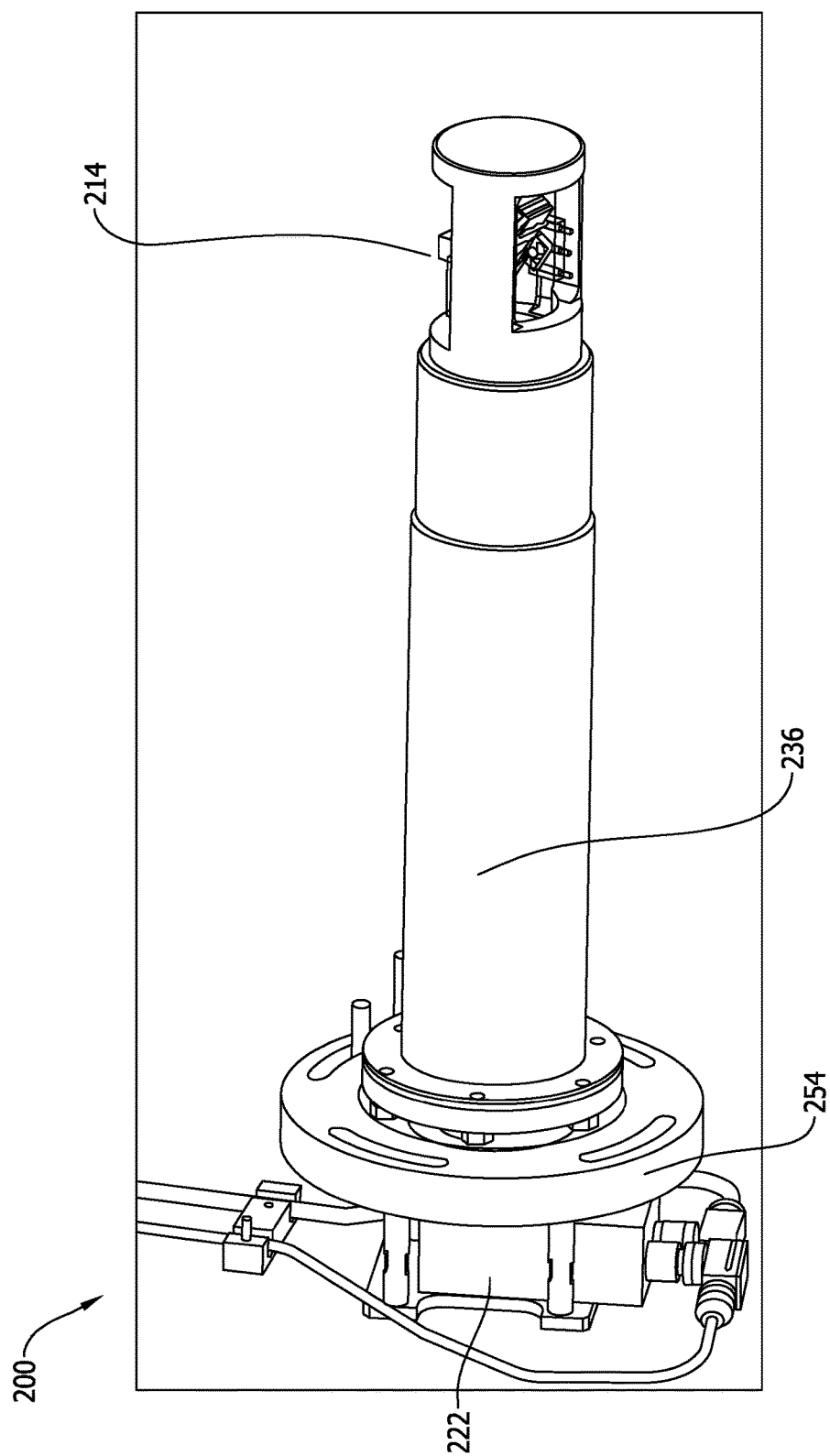
Figure 9:
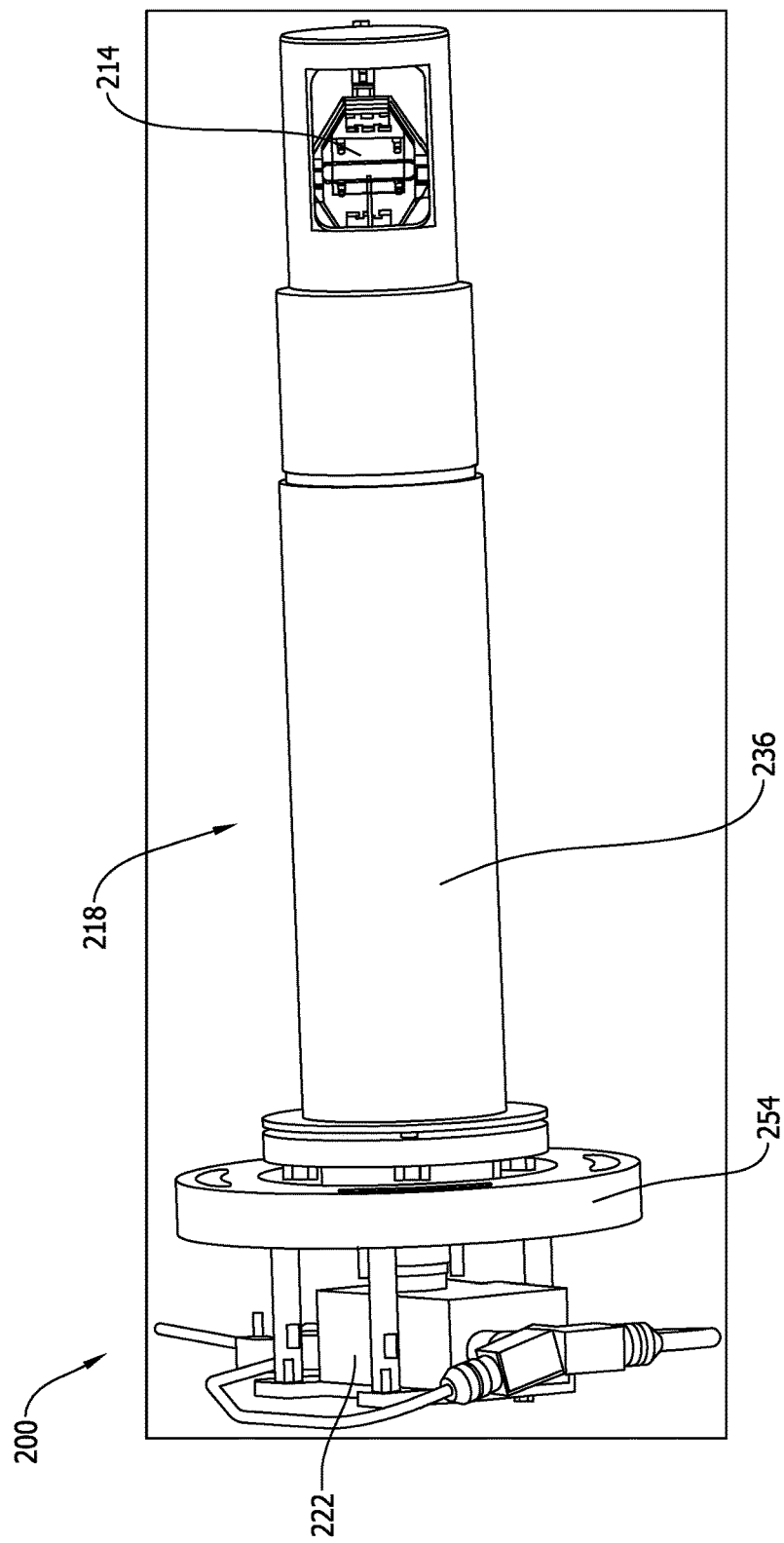

As shown in FIGS. 4-6, the camera 212 is enclosed in a casing 222 mounted to an end of the housing 218. A panel 224 provides access to the interior of the casing 222 to allow servicing and replacement of the camera 212. The panel 224 is connected to a sidewall 226 of the casing 222 by a hinge 228 that allows the panel to be pivoted between an opened position and a closed position. The camera 212 may be accessed without an operator entering the hot cell 210 (shown in FIG. 2) because the casing 222 is located on the exterior of the hot cell. In the example embodiment, the panel 224 is constructed of radiation-shielding materials and, in the closed position, shields the exterior of the hot cell from low-level gamma radiation that may be deflected by air molecules, colloquially referred to as "sky shine". For example, the panel 224 may inhibit sky shine from traveling through the scanning system 200 and escaping to the exterior environment.

Figure 13:
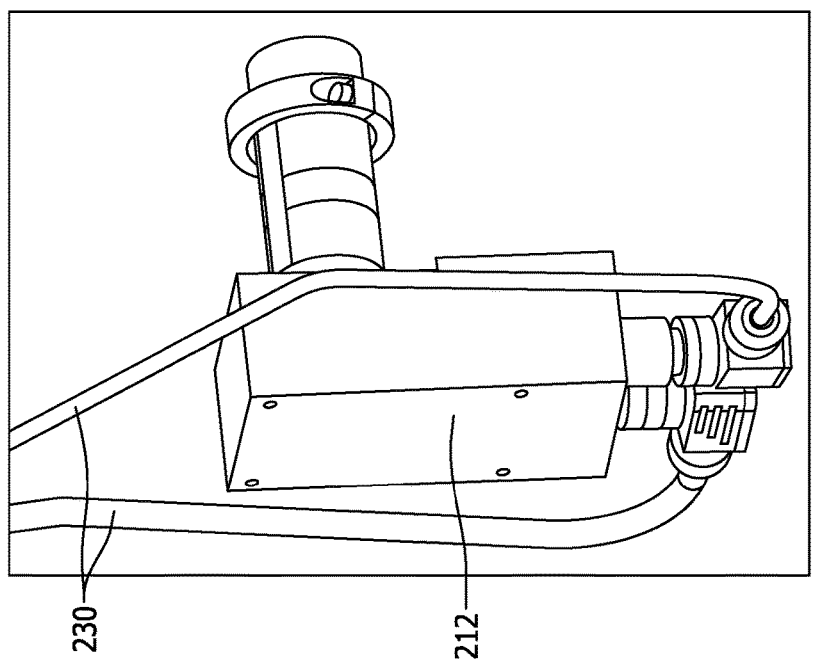
FIG. 13 is an isometric view of the camera of the scanning system.

With reference to FIGS. 6 and 13, cables 230 are connected to the camera 212 and extend through the casing 222. In suitable embodiments, any number of cables 230 may be connected to the camera 212 that enable the scanning system 200 to operate as described. In this embodiment, one cable 230 connects the camera 212 to the controller 216 to allow the camera and the controller to communicate. In suitable embodiments, the camera 212 may communicate wirelessly with the controller 216. In such embodiments, the cable 230 connecting the camera 212 to the controller 216 may be omitted.

In reference to FIG. 2, in suitable embodiments, the scanning system 200 may communicate with any controller 216 that enables the scanning system 200 to operate as described. The controller 216 may cause the camera 212 to automatically generate images of objects during the operation of the system 100. For example, the controller 216 may cause the camera 212 to capture images of the barcode 202 on a generator 204 when the controller receives signals that the generator has reached a specified location. The controller 216 may adjust the position of the object being scanned prior to the camera 212 generating an image. After the object is scanned, the camera 212 may send a signal to the controller 216 relating to a generated image. In suitable embodiments, the controller 216 may perform functions based on the information received from the scanning system 200.

In suitable embodiments, the scanning system 200 may be powered by an external and/or an internal power source. In this embodiment, a cable 230 (shown in FIG. 6) connects the camera 212 to an external power source.

The scanning system 200 may include any suitable camera 212 that enables the scanning system to operate as described. Moreover, the camera 212 may include any suitable features that enable the camera to operate as described. For example, the zoom, focus, and aperture of the camera 212 may be adjustable. In this embodiment, the camera 212 includes a C-mount zoom lens connected to a DATALOGIC MATRIX 410 bar code camera.

In reference to FIGS. 4 and 7-10, the housing 218 includes an end cap 232, an outer cover 234, and a guide tube 236. In the illustrated embodiment, portions of the housing 218 are cylindrical. In particular, the guide tube 236 is cylindrical. In other embodiments, the housing 218 may be any shape that enables the housing 218 to function as described. For example, in some embodiments, the housing 218 may be cuboid.

The guide tube 236 includes a sidewall 238 that forms the conduit for light to travel between the camera 212 and the mirror 214. The end cap 232 closes one end of the guide tube 236 and defines an opening 240 for light to enter the housing 218. The outer cover 234 includes an inlet 242 that may direct light into the opening 240. The inlet 242 and the opening 240 allow light to enter the housing 218 at an angle relative to a longitudinal axis 219 of the housing. The mirror 214 is located within an interior space of the end cap 232 and directs light that enters the housing 218 towards the camera 212. In operation, light travels towards the mirror 214 in a first direction, strikes the mirror, and is redirected in a longitudinal direction through the guide tube 236 towards the camera 212. The mirror 214 may be positioned at any suitable angle that enables the mirror to direct light towards the camera 212.

Figure 10:
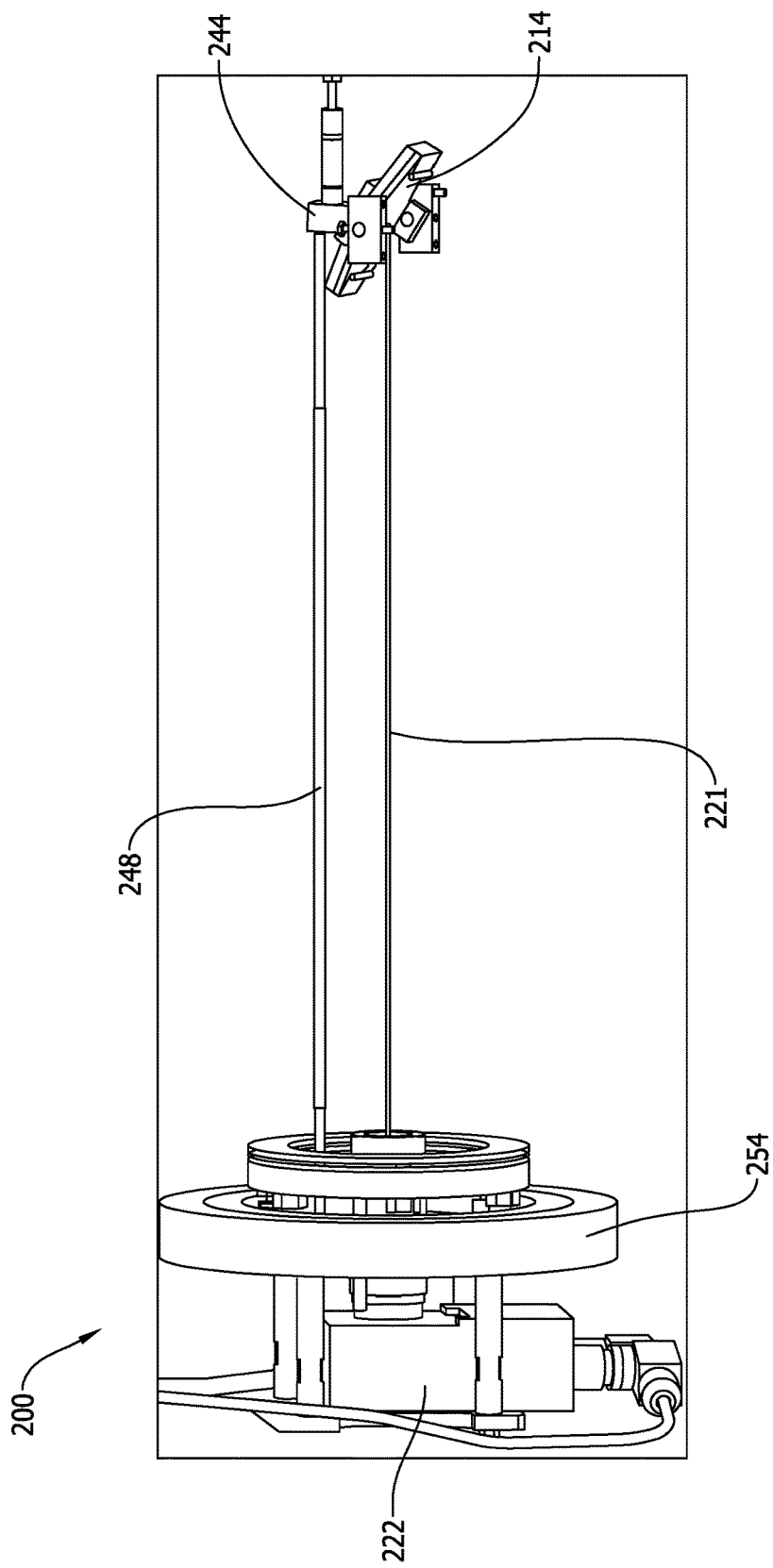
Figure 11:
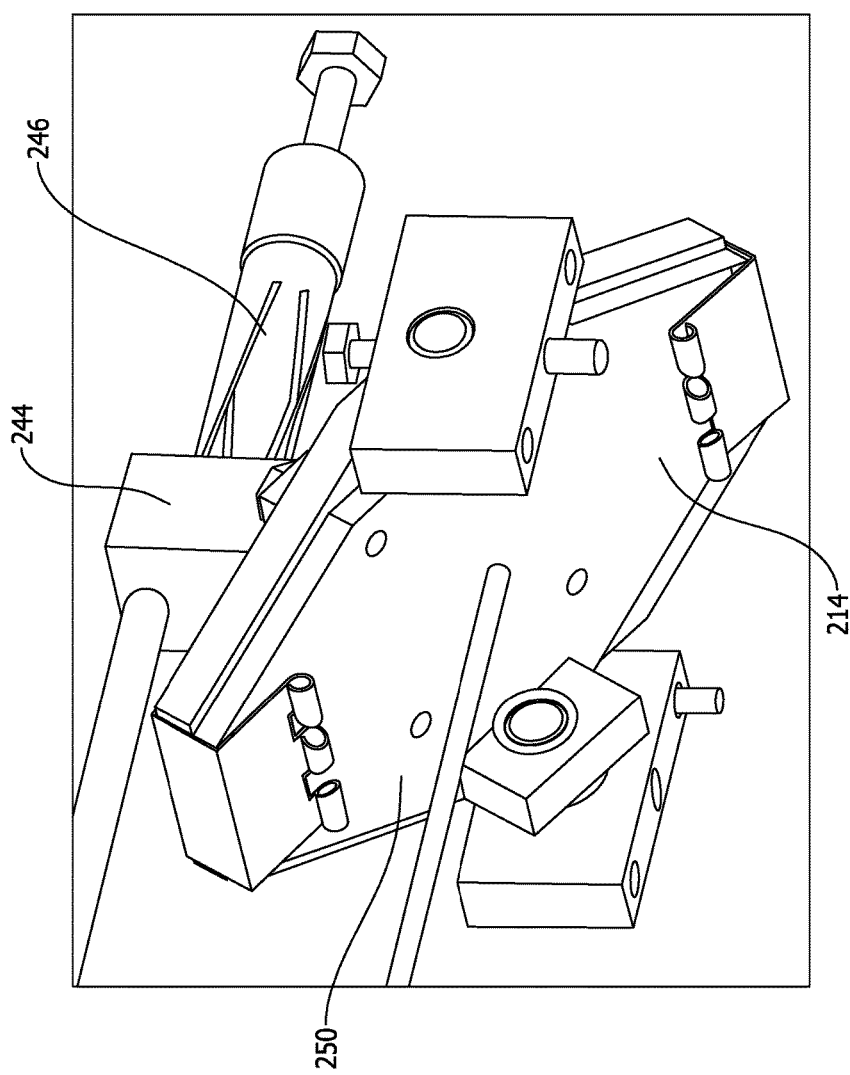
FIG. 11 is an isometric view of a mirror of the scanning system.

As shown in FIGS. 10 and 11, a positioning mechanism 244 is connected to the mirror 214 to control the position of the mirror. The positioning mechanism 244 pivots the mirror 214 about a pivot axis. Accordingly, the mirror 214 may be positioned at angles in relation to the camera 212 and the object being scanned. In this embodiment, the positioning mechanism 244 includes a biasing member 246 that provides a biasing force to assist in adjustment of the mirror 214. Moreover, the positioning mechanism 244 includes an arm 248 that extends longitudinally along the housing 218 to the exterior of the hot cell 210 to allow adjustment of the mirror 214 from the exterior of the hot cell. In other embodiments, the scanning system 200 may include any positioning mechanism 244 that enables the scanning system to operate as described.

In suitable embodiments, the mirror 214 may be adjusted manually and/or automatically. For example, the positioning mechanism 244 may be connected to the controller 216 such that the controller positions the mirror 214 based on user inputs. The controller 216 may also position the mirror 214 based on information received from sensors that detect a position of the generators 204.

As shown in FIG. 11, in this embodiment, the mirror 214 is octagonal. In other embodiments, the mirror 214 may be any shape that enables the mirror to operate as described.

Also, in this embodiment, the mirror 214 includes a surface 250 that reflects light. Specifically, in this embodiment, the mirror 214 includes a glass surface that reflects electromagnetic radiation in the visible spectrum. Accordingly, light striking the surface 250 of the mirror 214 is reflected off the surface at an angle that is equal and opposite to an angle of incidence of the light. Additionally, in this embodiment, the mirror 214 is substantially transparent to nuclear radiation, such as gamma radiation, such that the nuclear radiation is not reflected by the mirror. In other embodiments, the mirror 214 may include any surfaces that enable the mirror to function as described. In some embodiments, the scanning system 200 may include surfaces 250 that redirect light without reflecting at least a portion of the light. For example, in suitable embodiments, the scanning system 200 may include one or more prisms and/or lenses to refract light. In such embodiments, the mirror 214 may be omitted.

In reference to FIG. 4, the housing 218 includes seals that inhibit air and airborne particles within the radioactive hot cell 210 from moving to the exterior of the hot cell. In particular, in this embodiment, the housing 218 includes O-ring seals. In addition, the housing end cap 232 includes a sealed window 252 protecting the mirror 214. The sealed window 252 is transparent to allow light to travel from the interior of the hot cell 210 to the mirror 214 and camera 212. In this embodiment, the sealed window 252 is optically pure, clear glass that does not distort images seen through the sealed window. The sealed window 252 of this embodiment is substantially free from radiation shielding materials, such as lead, tungsten or depleted uranium. Additionally, the glass has a thickness that does not distort images seen through the glass, such as a thickness no greater than 1 inch, or no greater than 0.75 inches, or no greater than 0.5 inches, or even no greater than 0.25 inches. In other embodiments, the scanning system 200 may include any other seals that enable the scanning system to operate as described.

Figure 12:
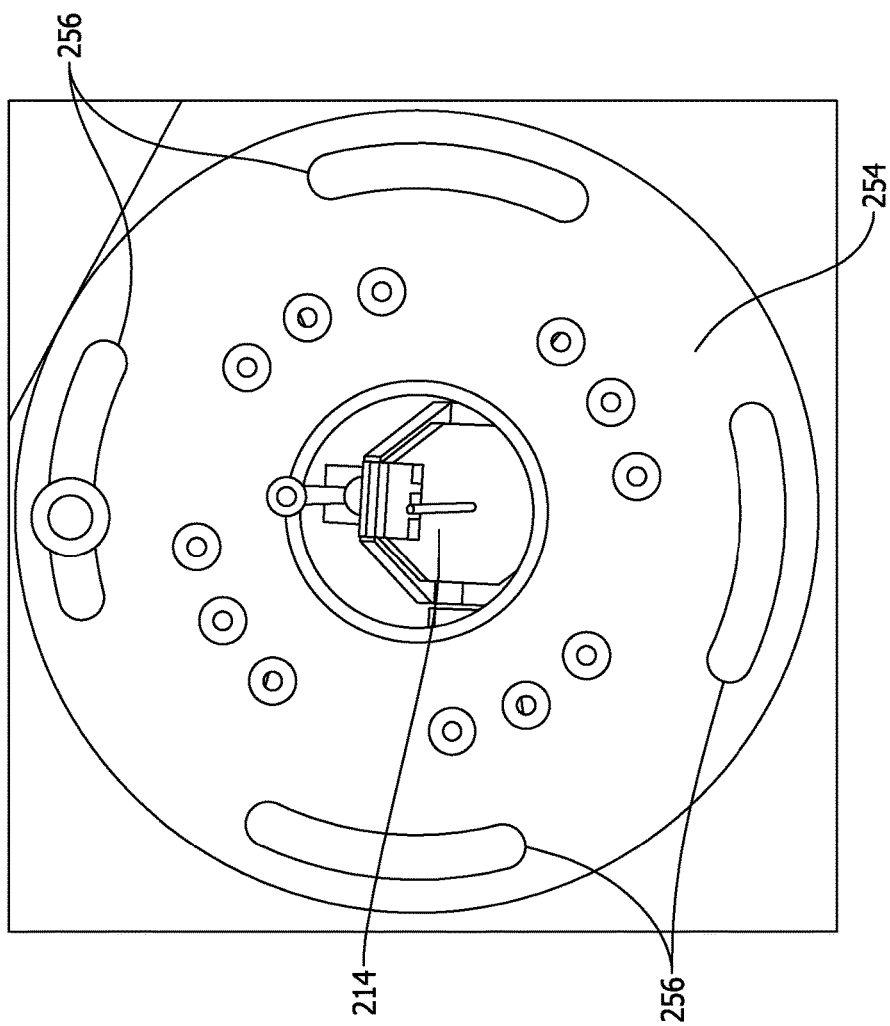
FIG. 12 is a front view of a mounting plate of the scanning system.

With reference to FIGS. 6 and 12, the scanning system 200 includes a mounting plate 254 that connects the scanning system 200 to the wall 220 and allows the scanning system to rotate about the longitudinal axis 219. The entire scanning system 200 (including the camera 212) may be rotated to aim the camera at different target areas. In this embodiment, the mounting plate 254 includes a plurality of slots 256. As shown in FIG. 12, the slots 256 have an arc shape. Fasteners extend through the slots 256 and connect the mounting plate to the wall. Fasteners may physically lock the entire scanning system 200 in a rotational alignment such that the camera 212 and mirror 214 are properly aimed at a barcode 202 positioned in a fixed spatial position within the hot cell 210. In the illustrated embodiment, the mounting plate 254 is circular. In other embodiments, the scanning system 200 may include any mounting plate 254 that enables the scanning system to operate as described.

Figure 14:
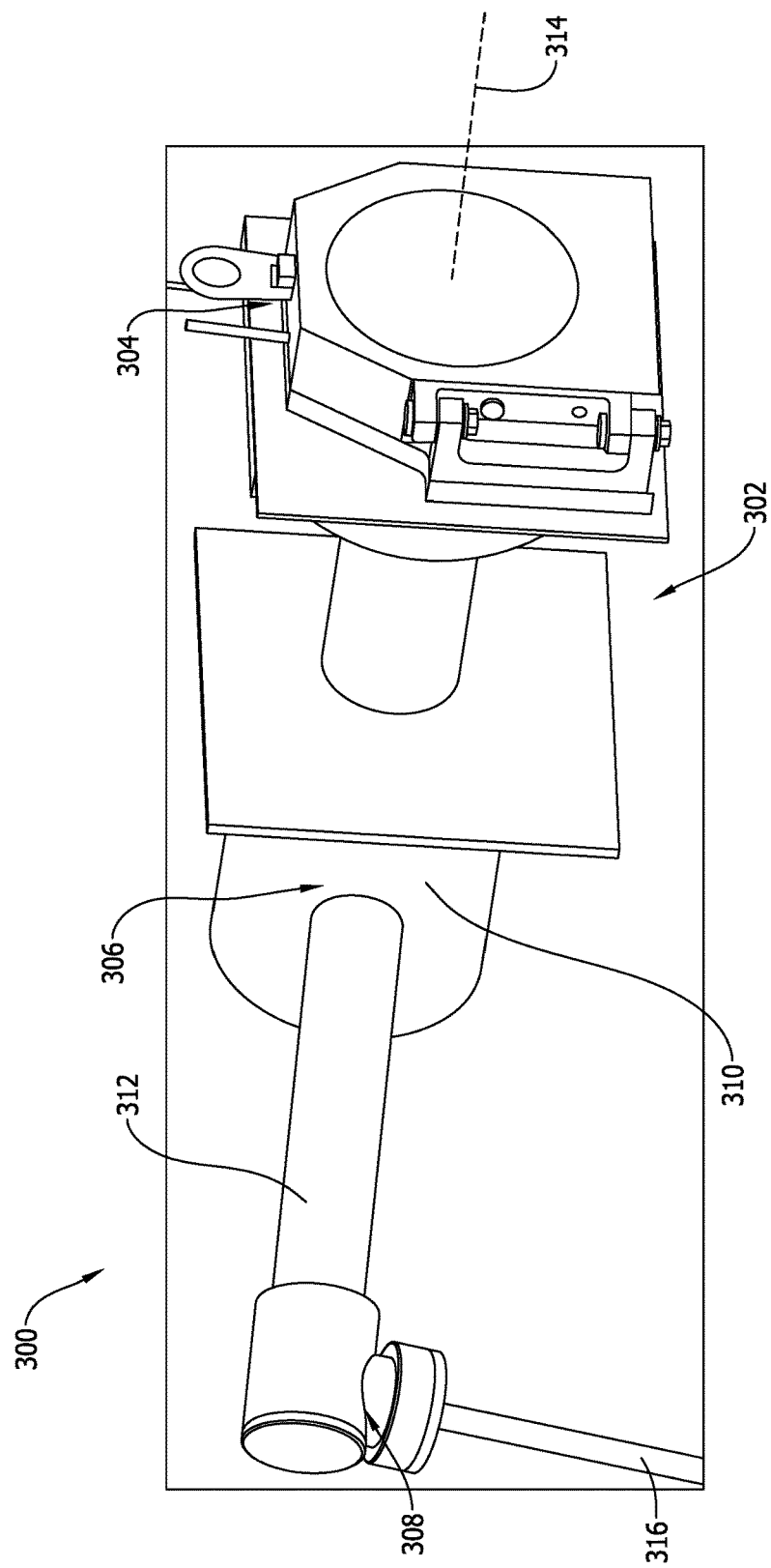
FIG. 14 is an isometric view of an example scanning system including two mirrors.

FIG. 14 is an isometric view of a scanning system 300 including two mirrors. In this embodiment, the scanning system 300 includes a housing 302, a camera 304, a first mirror 306, and a second mirror 308. In other embodiments, the scanning system 300 may include any number of mirrors. For example, in some embodiments, the scanning system 300 may include three or more mirrors. In suitable embodiments, the first mirror 306 and/or the second mirror 308 may be adjustable to facilitate the scanning system 300 scanning different objects.

The housing 302 includes a main body 310 and an extension arm 312. The extension arm 312 extends from the main body 310 at an angle in relation to a longitudinal axis 314 of the main body. The extension arm 312 allows the scanning system 300 to generate images of objects that may be obstructed and/or difficult to see from an exterior of the hot cell. In this embodiment, the extension arm 312 is substantially perpendicular to the main body 310. In other embodiments, the scanning system 300 may include any suitable housing 302 that enables the scanning system to operate as described.

The camera 304 is on the exterior of the hot cell at an end of the main body 310 and is spaced from the extension arm 312. The extension arm 312 and a portion of the main body 310 are in the hot cell. The first mirror 306 is located where the extension arm 312 and the main body 310 join. The second mirror 308 is located in the extension arm 312 at an end spaced from the main body 310. The extension arm 312 includes an opening for light 316 to enter the extension arm and strike the second mirror 308. In operation, light 316 enters the opening and strikes the second mirror 308. The second mirror 308 directs light towards the first mirror 306. The first mirror 306 then directs light 316 towards the camera 304. Accordingly, the housing 302 forms a conduit for light 316 to travel along an indirect path between the object and the camera 304.

The scanning systems described above achieve superior results compared to some known systems and methods. The scanning systems include cameras that are positioned on the exterior of hot cells such that the cameras are not exposed to relatively high levels of radiation and/or corrosive chemicals. Also, the cameras are accessible from the exterior of the hot cell to allow service and/or replacement of the cameras without entering the hot cell. The scanning systems are located at an elevation above radioactive materials and provide an optically pure, indirect path for light to travel between the camera and an object in the hot cell. As a result, direct radiation shine is prevented from escaping to the hot cell exterior. In addition, the scanning systems provide more accurate results than cameras that scan through thick lead glass shielding windows (which may optically distort images). Moreover, the scanning system includes a housing that extends between the camera and a mirror and is sealed against air and airborne particles from the radioactive environment. Accordingly, the scanning systems described above generate images of objects, such as barcodes, located anywhere in the hot cell, and prevent nuclear radiation and airborne contamination from leaking to the exterior of the hot cell.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for manufacturing radionuclide generators, the system comprising:
   an enclosure defining a radioactive environment, the enclosure including nuclear radiation shielding to prevent nuclear radiation within the radioactive environment from moving to an exterior of the enclosure; and
   a barcode positioned on an object within the enclosure;
   a scanning system for scanning the barcode, the scanning system comprising:
      a camera on the exterior of the enclosure;
      a mirror; and
      a conduit extending through a wall of the enclosure for light to travel between the camera and the mirror, the conduit including a sidewall.

2. The system of claim 1 further comprising a sealed window between the mirror and the barcode, the sealed window being transparent to allow light to travel from an interior of the enclosure to the mirror and the camera.

3. The system of claim 2, wherein the window is substantially free from radiation shielding materials.

4. The system of claim 1, wherein the mirror is a first mirror, the scanning system further comprising a second mirror to direct light towards the first mirror.

5. The system of claim 1, wherein the mirror is positionable relative to the camera.

6. The system of claim 5, wherein the scanning system rotates about an axis.

7. A scanning system for scanning objects in a radioactive environment, the objects being in an interior space of a hot cell, said scanning system comprising:
   a camera on the exterior of the hot cell;
   a mirror; and
   a conduit extending through a wall of the hot cell for light to travel between the camera and the mirror, the conduit including a sidewall, wherein the conduit is sealed to prevent air moving between the radioactive environment and the exterior of the hot cell.

8. The scanning system of claim 7, wherein a sealed window extends between the hot cell interior and the mirror, the sealed window being transparent to allow light to travel from the hot cell interior to the mirror and the camera.

9. The scanning system of claim 8, wherein the window is substantially free from radiation shielding materials.

10. The scanning system of claim 7, wherein the mirror is a first mirror, the scanning system further comprising a second mirror.

11. The scanning system of claim 7, wherein the mirror is positionable relative to the camera.

12. The scanning system of claim 11, wherein the scanning system rotates about an axis.

13. The scanning system of claim 7, wherein the conduit includes a cylindrical guide tube.

14. The scanning system of claim 13 further comprising a mounting plate connecting the conduit to the wall, wherein the scanning system rotates in relation to the wall about a longitudinal axis.

15. The scanning system of claim 7, wherein the wall comprises a nuclear radiation shielding material.

16. A method for scanning a barcode on an object in a radioactive environment, the object being in an interior space of a hot cell, said method comprising:
   positioning the object in the interior space such that light travels from the barcode to a mirror;
   directing the light from the mirror through a conduit extending through a wall of the hot cell toward a camera on an exterior of the hot cell, the conduit including a sidewall, wherein the conduit is sealed to prevent air moving between the radioactive environment and the exterior of the hot cell; and
   generating an image of the barcode using the camera.

17. The method of claim 16 further comprising directing the light through a sealed window, wherein the sealed window extends between the hot cell interior and the mirror, the sealed window being transparent to allow light to travel from the hot cell interior to the mirror and the camera.

18. The method of claim 16, wherein the mirror is a first mirror, the method further comprising directing the light toward the first mirror using a second mirror.

19. The method of claim 16 further comprising positioning the mirror relative to the camera.

20. The method of claim 16 further comprising rotating at least one of the conduit and the camera.

* * * * *